H. A. MORRIS.
MACHINE FOR COUNTING OUT AND PAYING SUMS OF MONEY.
APPLICATION FILED APR. 5, 1918.

1,365,262.

Patented Jan. 11, 1921.
11 SHEETS—SHEET 1.

H. A. MORRIS.
MACHINE FOR COUNTING OUT AND PAYING SUMS OF MONEY.
APPLICATION FILED APR. 5, 1918.

1,365,262.

Patented Jan. 11, 1921.
11 SHEETS—SHEET 3.

H. A. MORRIS.
MACHINE FOR COUNTING OUT AND PAYING SUMS OF MONEY.
APPLICATION FILED APR. 5, 1918.

1,365,262.

Patented Jan. 11, 1921.
11 SHEETS—SHEET 5.

Witnesses

Inventor

H. A. MORRIS.
MACHINE FOR COUNTING OUT AND PAYING SUMS OF MONEY.
APPLICATION FILED APR. 5, 1918.

1,365,262.

Patented Jan. 11, 1921.
11 SHEETS—SHEET 7.

Witnesses
Grace P Brereton
Albert Popkins

Inventor
Harold Austin Morris
By Sturtevant & Mason
Attorneys

H. A. MORRIS.
MACHINE FOR COUNTING OUT AND PAYING SUMS OF MONEY.
APPLICATION FILED APR. 5, 1918.

1,365,262.

Patented Jan. 11, 1921.

H. A. MORRIS.
MACHINE FOR COUNTING OUT AND PAYING SUMS OF MONEY.
APPLICATION FILED APR. 5, 1918.

1,365,262.  Patented Jan. 11, 1921.
11 SHEETS—SHEET 11.

UNITED STATES PATENT OFFICE.

HAROLD A. MORRIS, OF LISCARD, ENGLAND, ASSIGNOR OF ONE-HALF TO WILLIAM PHILLIPS THOMPSON, OF LIVERPOOL, ENGLAND.

MACHINE FOR COUNTING OUT AND PAYING SUMS OF MONEY.

1,365,262.   Specification of Letters Patent.   Patented Jan. 11, 1921.

Application filed April 5, 1918. Serial No. 226,852.

*To all whom it may concern:*

Be it known that I, HAROLD AUSTIN MORRIS, a subject of the King of Great Britain, residing at Liscard, in the county of Chester and Kingdom of England, have invented certain new and useful Improvements in Machines for Counting Out and Paying Sums of Money, of which the following is a specification.

This invention has for its object a machine for quickly paying out wages and other like sums. In the succeeding description I have described the invention as actually made by me for British market. It is obvious however that for other countries different coins and consequently slightly different arrangements must be used to adapt it for use in such countries.

These can be arranged in a single keyboard, two keyboards, or three keyboards, as preferred, but I claim nothing in the special arrangement of keyboards.

It is best described by aid of the accompanying drawings of my experimental device, in which.

Fig. 4ª is a similar section taken on the completion of the forward movement of the carriage.

Figure 1:
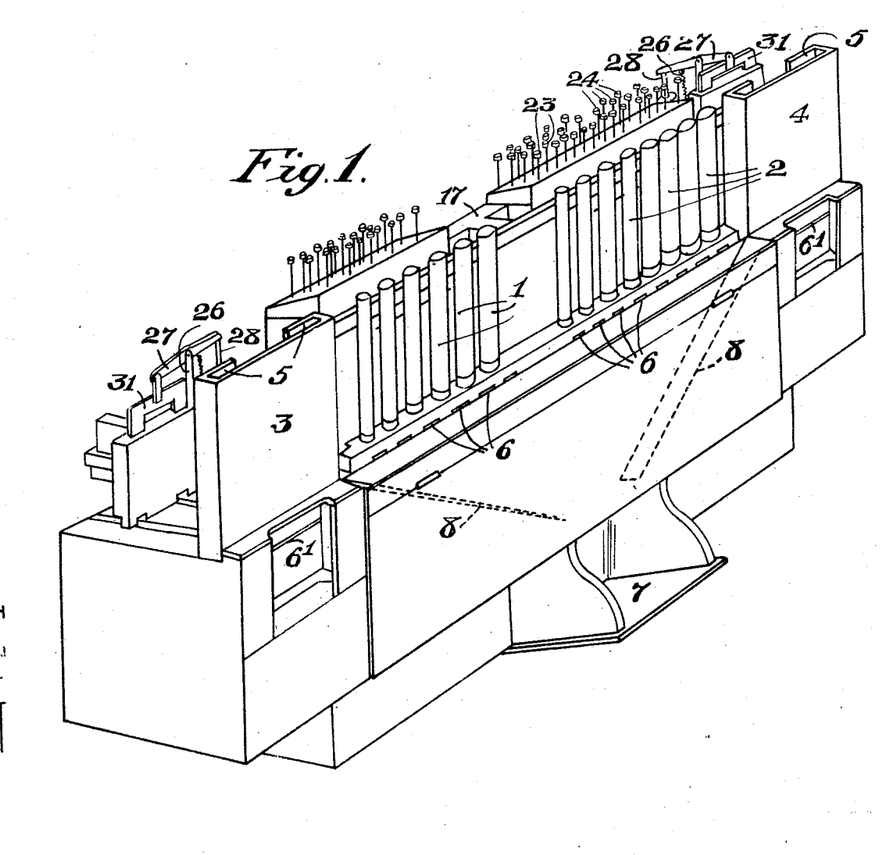
Figure 1 is a perspective front view.
Figure 4:
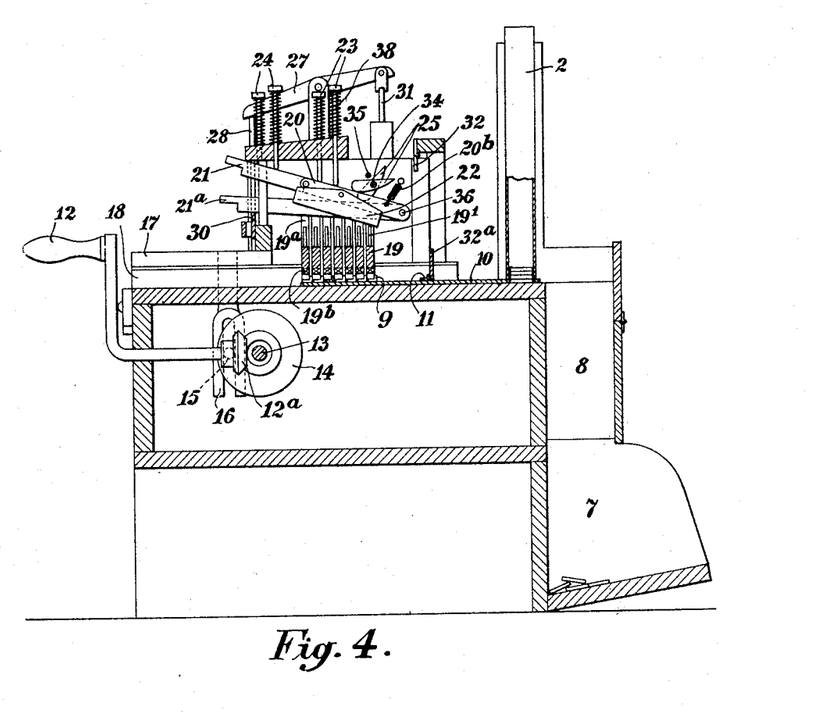
Fig. 4 is a cross section through the coin operating mechanism before being actuated.
Figure 4A:
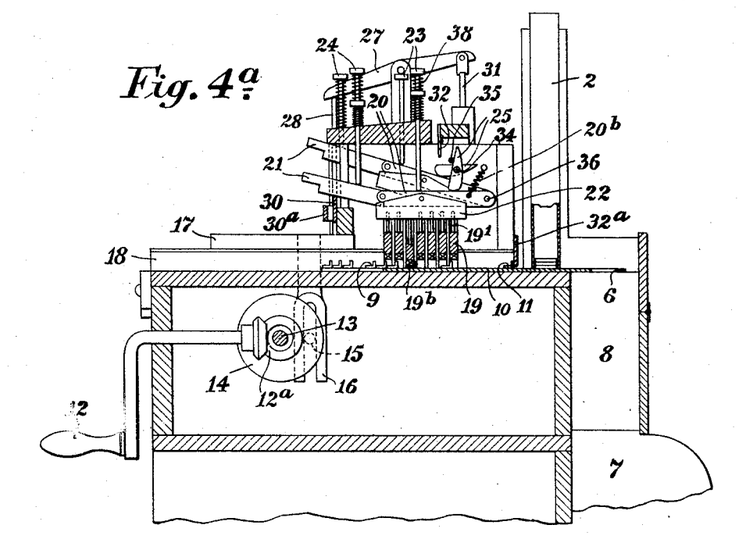
Figure 5:
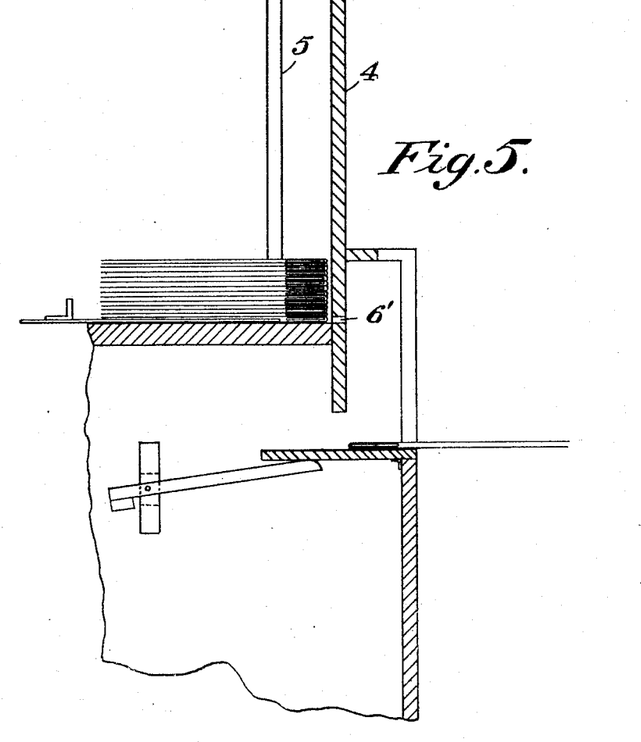
Fig. 5 is a detail section of the note movement.
Figure 6:
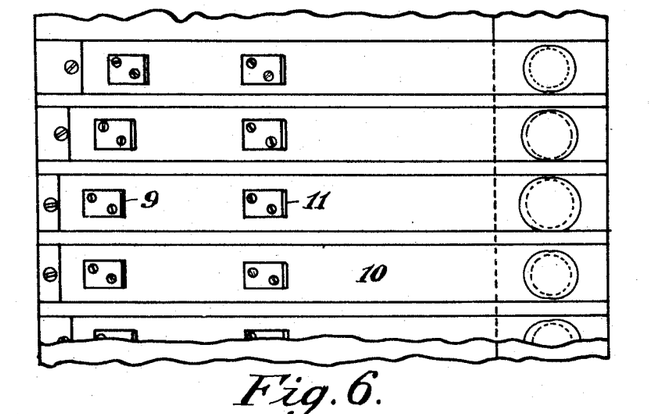
Fig. 6 is a plan view of the coin slides.
Figure 13:
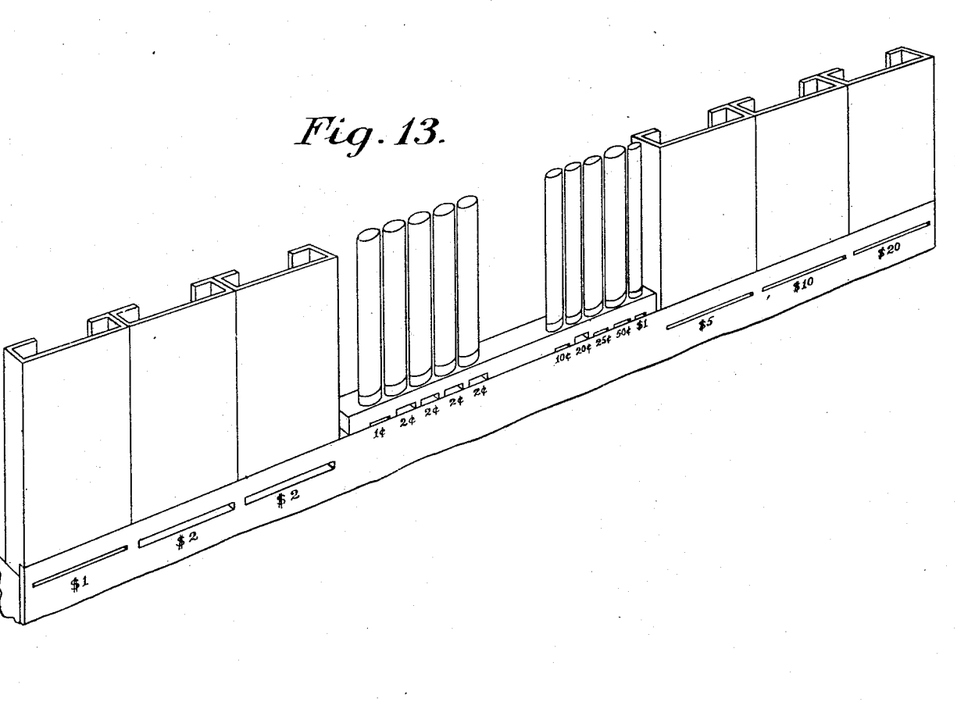
Fig. 13 is a perspective view of receivers and slides for United States money.
Figure 14:
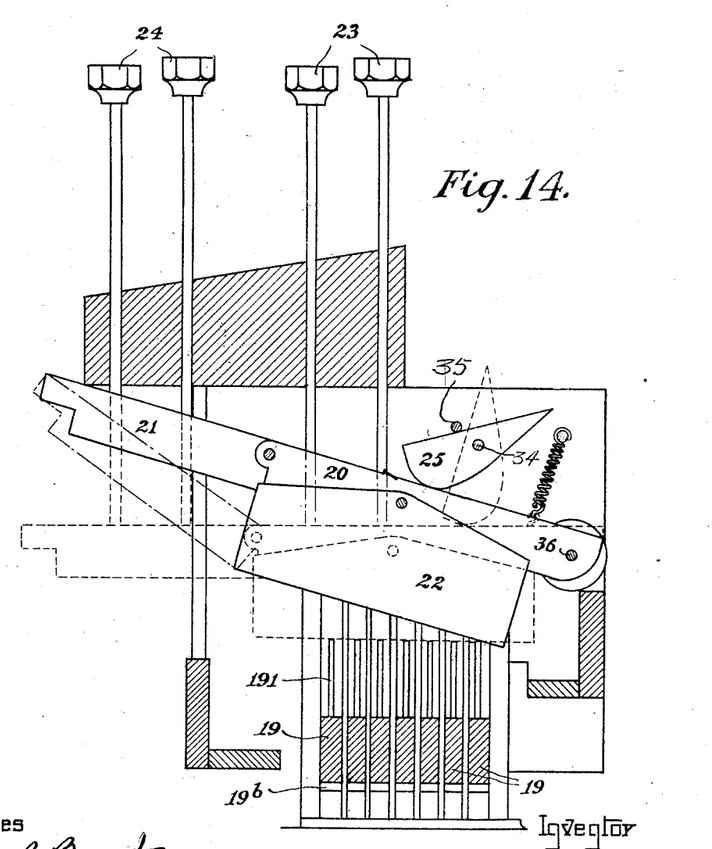
Fig. 14 an enlarged section of keyboard and keys.
Figure 15:
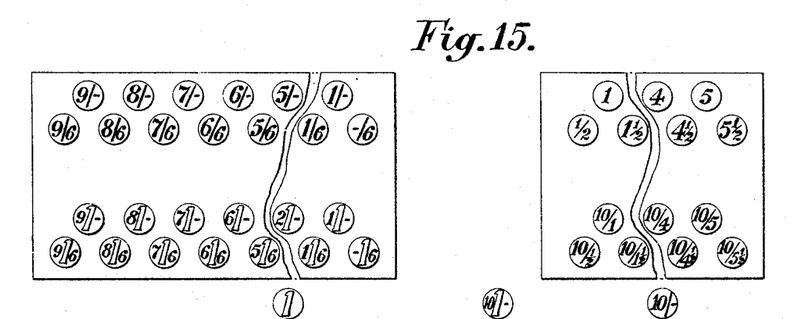
Fig. 15 a partial plan showing a view of the keys.

In Fig. 1 and others following it 1, 1, are tubes for copper coins, namely one half penny and five penny tubes; 2, 2, other tubes for silver coins. These latter are shown in the drawings as eight in number, one for sixpences, three for shillings, two for florins and two for half crowns, but of course with American or foreign money, tubes corresponding to such money would have to be substituted. (See Fig. 13 for United States money.) 3 and 4 are the columns for notes (one being one pound notes, and other ten shillings) and for the thin bars, hereafter described, around which they are folded. These bars are nearly the whole length inside the embayments 5 of the receptacles 3 and 4 respectively and are a simple thin plate of metal. The notes only extend out through the opening between the two embayments. A note is simply doubled around the bar. This is shown in Fig. 5 in which a dozen or more bars are shown each with a note doubled around it. The bar and the note together are slightly narrower than the slot 6′ through which they are pushed. In Fig. 5 a note is shown where it has fallen down and turned over so as to protrude beyond the casing. One edge of the note may then be grasped and withdrawn leaving the bar in the receptacle 7 (Figs. 1 and 4). The entire series of the coin and note slots 6 and 6′ is shown in Fig. 1. A few coins are shown in Fig. 4 as fallen down guided into the receptacle 7 by the sloping pieces—8, 8, Fig. 1. 9 is a catch on a slide or plate 10 Figs. 4—4ª and 6 used for shooting out the coins. There is one ejector slide 10 for each tube or pile of notes. The ejector slides can each have a hole or slot in them rather larger than the coin, so that the coin falls into the hole, but when the slide is pushed out the coin falls down into the receptacle 7. Another catch 11, also mounted on the slide 10, is used to bring the slide back, this catch coming in contact with a fixed longitudinal bar 32ª on the reciprocating carriage on its return journey, which pushes all the operated ejector slides 10 back to normal position. An ordinary otherwise impervious ejector slide nearly the width of the slot pushes out the notes and their bars.

Figure 2:
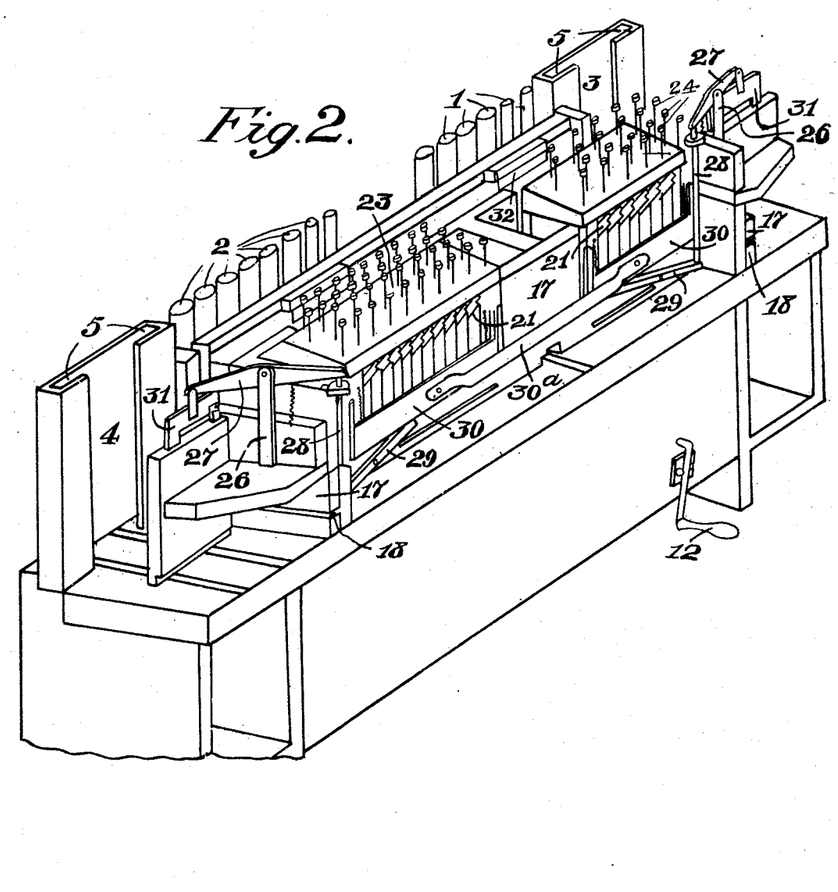
Fig. 2 is a perspective back view.
Figure 7:
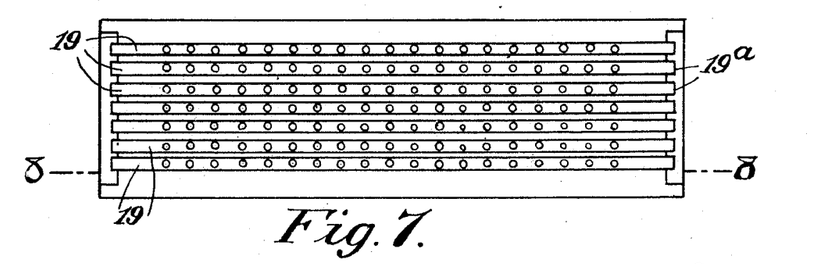
Fig. 7 is a plan of push bars with the keys removed.
Figure 8:
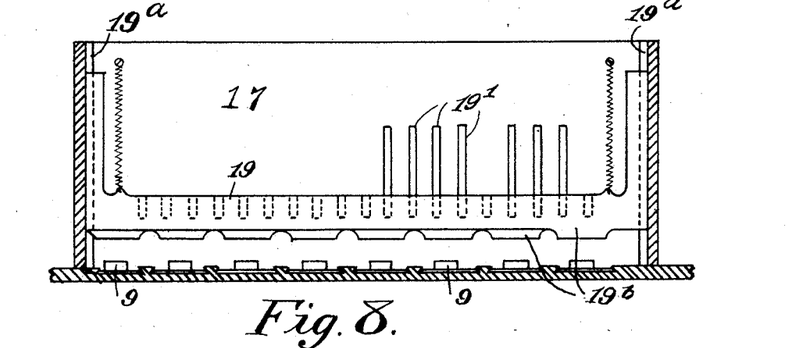
Fig. 8 is a section of Fig. 7, on the line 8—8.
Figure 9:
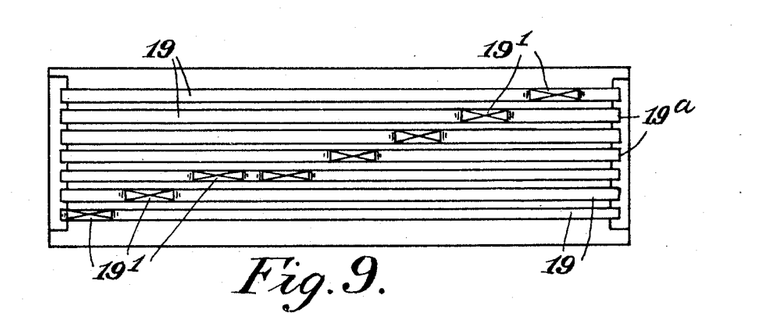
Fig. 9 is an underneath plan showing the projections to engage with the catches on the coin slides.
Figure 10:
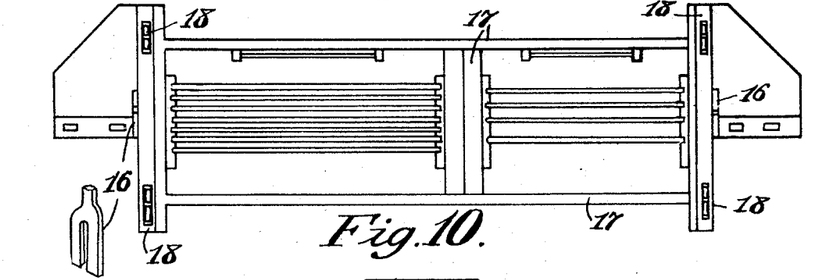
Fig. 10 is an underneath plan of the movable table or box.
Figure 11:
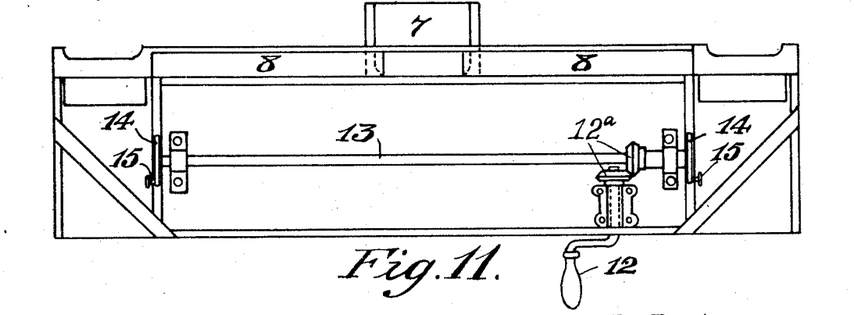
Fig. 11 is an inside plan showing the gearing.

Referring now to Figs. 4, 4ª, and 11, the handle 12 with the beveled gear 12ª, as shown, actuates a longitudinal shaft 13, the sole object of which is to carry two disks 14 at opposite ends of the casing, having each a small pin 15 on which the prongs 16 hold. Consequently, by turning the wheel around, the carriage to which the prongs 16 are attached is reciprocated. The ejector slides 10 slide in the stationary casing of the machine. The carriage 17 above, slides in grooves or on rails 18 Figs. 2, 4 and 4ª (one near each end of the machine) as the handle 12 is rotated. On this carriage 17 extending the whole length of each series of tubes is a series of longitudinal pushers 19, Fig. 8. The pushers slide vertically in slots 19ª, Figs. 7, 8, and 9 at each end of the carriage and on divisional walls 17ᵇ, Fig. 10. These pushers have threaded holes in them all the way along at the top in which pins 19′ are screwed at intervals. These pushers are cut away in the bottom leaving parts 19ᵇ which, when they are pushed down as hereafter described, come against one or more of the catches 9 on slides 10 at the reciprocation of their carriage. The cut away portions are so arranged that each pusher operates a different coin tube or set of coin tubes so that by a combination of these bars any number of tubes can be operated by one key, as each key operates bars 20 and 21 at right angles to the pushers and pushes down all the pushers which have pins under said particular bars 20 or 21.

On the carriage are carried two keyboards one for silver, and the other for the copper. The silver coin box has a series of keys 23 in two rows marked 6d, 1ˢ/—, 1ˢ/6 and so on to 9ˢ/6. Another similar set of keys 24, which are connected also with the one pound delivery device by the knuckle hinge levers 21, on being pressed down by a key, are pressed on to the bars 30, 30. These press down the levers 29, which at their other ends press up the pins 28, and oscillate the levers 27, and thus press down the slide or pusher 31 which engages the catch 9 of the ejector slide 10 of the note column nearest them. There is a link 30ª between the two bars 30 loosely pivoted to each of them, consequently the note column on one side only is pushed down by the keys on that side, but if it is wanted to pay one pound ten shillings, the bar 30ª is pressed down and thus both bars 30 are pushed down together. The purely shilling coin key presses down the lever 20 to its operative position but not the hinged parts 21, which simply rest on the bar 30 as shown in Fig. 4ª, consequently it only presses the pins 19′ on the push bars 19 pressing the push bars down so as to come in contact with the required slides. The other set of keys 24 besides doing this, push down the hinged portion 21, and thus come in contact with and depress a bar 30 which actuates the pound or ten shilling delivery as the case may be, or a bar 30ª is pressed by hand which delivers both one pound and ten shillings. After the note bars have been depressed, they may be held down by lever 21ª (Fig. 4) whose action is similar to lever 20. In Figs. 4 and 4ª, 20 is a main lever pivoted at 36, having the push piece 22 fixed thereon, and 21 is the hinged piece. When, therefore, the keys 23 are pressed down, they only press down the parts 20 and 22, but when the keys 24 are pressed down they come upon the hinged part 21 of the lever which is knuckle jointed to the other part 20, and consequently they push down not merely the pins on the pushers, but also a bar 30 which is linked by a bar 29 operatively connected to the one pound delivery, or, if at the other end of the machine, to the ten shilling one. Above each of the levers 21 and 22 is a triangular tappet 25 strung loosely on a bar 34 immovable on the carriage. A similar bar 35 stops the movement of the tappet beyond its vertical position and the tappet is weighted so that when one of the levers 20 is pushed down the tappet turns over on its weighted end and prevents the lever rising again till the tappet is turned over. This is done by the hinged flap 32 (Fig. 4) mounted on a frame carried by the casing which in the coin delivery stroke comes in contact with any tappet standing on its heavy end and causes it to fall over and allows the lever to rise, being actuated thereto by a spring.

Figure 3:
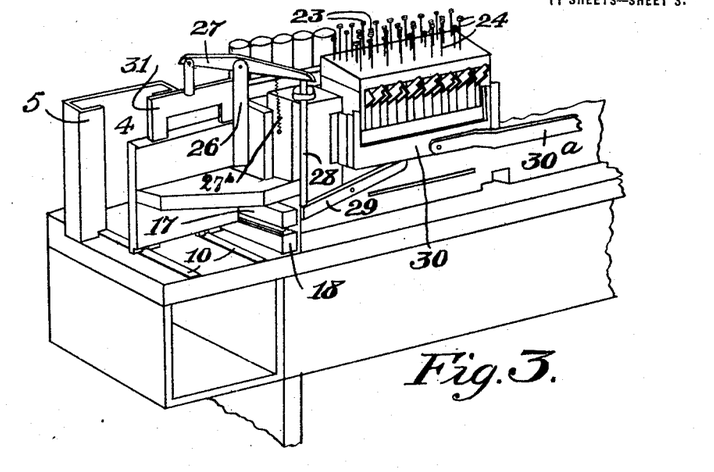
Fig. 3 is a detail perspective view from the back showing the one pound or the ten shilling note movement.

The vertical sliding pusher 31 is normally kept up by a spring 27ᵇ Fig. 3 but when it is actuated it comes in contact with an ejector slide 10 on the bottom frame which pushes out a note with the plate around which it is folded. Springs 27ᵇ, Fig. 3, 20ᵇ, Fig. 4, keep the pushers, the pivoted and sliding catches 25, Fig. 4, and other parts out of action in normal position, except when forcibly pushed back. The ten shilling note apparatus is worked in precisely the same manner as the one pound note apparatus. There is a vertical rod 28 in each between its lever 27 and the connecting bar 29 so that either of them can be used in conjunction with the bar 30 or be thrown out of gear.

Figure 12:
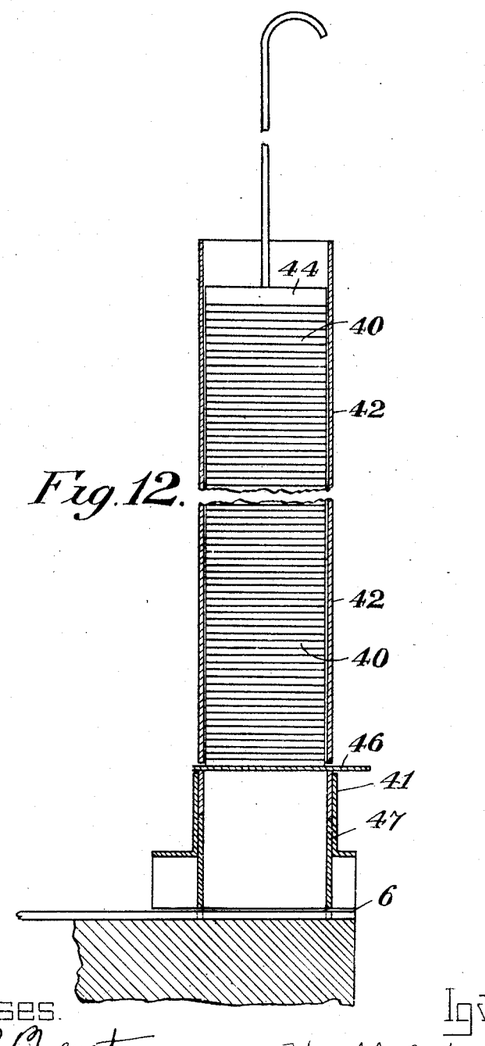
Fig. 12 is a section of tube to carry coin.

The coin tubes are shown in Fig. 12 with the method of applying them. 41 is the socket in which they are fitted. 42 the tube itself; 47 an inner tube on which tube 42 stands. 40 represents the coins, and 44 a dummy coin thicker than an ordinary coin so that it will not pass through the slot 6. The dummy coin has a curved rod attached to it so as to pull it out again. The tube 42 is fitted into the tube 41, and then the slide 46 withdrawn. When the coins are exhausted it is found out at once by the machine not operating as the slide 10 comes in contact with the dummy coin. The dummy coin and the tube are lifted out and another tube of coins put into their place.

I claim as my invention:—

1. A machine for counting out and paying sums of money, consisting of a base, a series of money tubes, each for one particular denomination of money and each having a slot near the bottom on opposite sides, an ejector slide to each tube capable of sliding through the slots, for propelling the required amount of money out at a forward motion, a carriage traveling on rails on the base, means for reciprocating the carriage at right angles to the line of tubes, a series of push bars on said carriage at right angles to the ejector slides including means for engaging at the bottom certain ejector slides when depressed so that each push bar operates a separate ejector mechanism, a series of finger keys carried by the carriage each marked with the entire sum required to be ejected by that key, and selective means whereby each key when pressed down will, when the carriage is reciprocated, operate one or more push bars corresponding to the amount of money marked on the key, and means for reciprocating the carriage to and fro, and of resetting the parts pressed down after each operation.

2. In a machine for counting out and paying sums of money, the combination of a base, a series of keys marked with consecutive amounts, a carriage carrying said keys, means for reciprocating said carriage, receptacles for money and ejector slides on the base, and means on the carriage for connecting each key with ejectors whereby to eject the exact sum marked on the key, and means for reciprocating the carriage in a direction parallel with the ejector slides, whereby the keys are only used to set the connection, and the reciprocation of the carriage does the work of paying out.

3. In a machine for counting out and paying sums of money, mechanisms for pushing out notes comprising a series of thin bars each having a note folded over it, means forming a receptacle having a wide aperture at back and a narrow slot in front, means for guiding said bars in said receptacle, an ejector slide adapted to fit in said front slot and adapted to push out the note and the bar, and mechanism for pushing out the ejector slide as required.

4. In a machine for counting out and paying sums of money, the combination of a base, a series of money receptacles thereon, each formed to hold one special variety of money, and each having slots at the bottom, a series of ejector slides carried by the base working in the slots, one for each receptacle, a carriage on the base, means for reciprocating it in a direction parallel with the ejector slides, and a series of finger keys on the carriage marked with sums of money, and connecting mechanism whereby whenever one key is depressed and the carriage reciprocated, the amount of money marked on the key will be ejected usually from several different receptacles.

5. In a machine for counting out and paying sums of money, the combination of a base, a series of money receptacles thereon, each formed for one special variety of money, and each having a slot at the bottom of each receptacle, a set of ejector slides having upward projecting pieces, each carried by the base, each working in the slots of its special receptacle, a series of vertically sliding selective push bars at right angles to the ejecting slides and having projections catching on the upward projecting pieces on the ejector slides below when they are pressed down, the series of keys and connecting mechanism whereby whenever a key pushes down one or more selector push bars and the carriage is reciprocated, a sum equal to the sum marked on the key used is ejected.

6. In a machine for counting out and paying sums of money, the combination of a base, a series of money receptacles thereon, each formed for one special variety of money, and each having a slot at the bottom, a series of keys, a set of ejector slides operated by the keys and carried by the base working in the slots of the various receptacles, a carriage, a series of vertically sliding selective push bars on the carriage at right angles to the ejector slides, means for reciprocating the same, said base having projections catching on the projecting pieces on the ejector slide below, and a lever below each key which when the key is pressed down pushes down one or more selector push pieces into locking action with ejectors, whereby when the carriage is reciprocated the amount marked on the key actuated is ejected.

7. In a machine for counting out and paying sums of money, the combination of a base, a series of money receptacles thereon, each formed to contain one special variety of money, and each having a slotted bottom, a set of ejector slides having upward projecting pieces fixed thereto said slides being carried by the base working in the slots of the various receptacles, a carriage, a series of vertically sliding selective push bars thereon at right angles to the ejecting slides, and having downward projections catching on the upward projecting pieces of ejector slides below, a series of keys operating the push bars, a lever below each key, and a series of removable vertical pins between the levers and the push pieces, whereby when a key is depressed the push pieces having pins between them and the levers are depressed and brought into locking position with the ejector slides below.

8. In a machine for counting out and paying sums of money, the combination of a base, a series of money receptacles thereon, each formed for one special variety of coin, and each having slots at the bottom, a set of ejector slides carried by the base passing through said slots and through the receptacles, a carriage on the base means for reciprocating it in a direction parallel with the ejectors, a series of finger keys on the carriage marked with consecutive sums of money, means for connecting each key with ejector slides for ejecting coins equal to the sums marked on the keys, a row of tumblers which when a key with its corresponding lever is depressed locks the depressed lever until the carriage is reversed and a hinged bar on the carriage which, when the carriage is reversed, comes in contact with the tumblers and sets them back into their normal position.

9. In a machine for counting out and paying sums of money, the combination of a keyboard, a set of keys thereon, each in a different line at right angles to the face of the machine, and marked with consecutive values in one particular denomination of coins, a set of hinged levers, one under each key, selecting and ejecting apparatus, a series of coin receptacles operated by said ejecting apparatus a second lever joined to the main lever and operated by a second key, and means for connecting this lever with a receptacle of higher denomination, whereby when the second key is depressed, it not merely causes the ejection of the sum marked on the first key, but the paying out of a piece of money of the higher denomination.

10. In a machine for counting out and paying sums of money, the combination of a series of receptacles each carrying one particular variety of money, each having a slot near the bottom at opposite sides, and each having an ejector slide capable of entering these slots and of pushing out money therefrom, abutments on the slides, push bars crossing above the ejector slides at right angles, finger keys, selective mechanism operated by the same, springs holding up the selective pusher bars, except when forcibly pressed down through the keys, means for locking them down till released after the ejection of the coin, and means for reciprocating the ejection and of unlocking the pusher bars near the end of such backward reciprocation.

11. In a machine for counting out and paying sums of money, the combination with a base plate, a series of money tubes with slots at the bottom, a series of ejector slides having abutments thereon, a carriage, means for reciprocating the same over the ejector slides, keys on the carriage each marked with consecutive sums of money, means for connecting each key when the latter is depressed with abutments on the ejector slides for ejecting the exact amount of money marked on the key, means for locking the connection till the carriage is reciprocated, and means on the carriage for unlocking the same when the reciprocation of the carriage and ejector bars has ejected the coin.

12. In an apparatus for paying out sums of money, the combination of a base, a series of coin tubes thereon, having slots at the bottom, ejector slides on the base, abutments on the slides, a carriage and means for reciprocating same over the ejector slides, a series of keys marked with consecutive sums of money on the carriage, intermediate selective parts between the keys and the slides, means for locking the selective parts when depressed by the key, thus keeping these parts in the path of the abutments and the abutments on the slides, and means for resetting the keys, selective parts and locking gear automatically when the carriage reciprocates.

13. In a machine for counting out and paying sums of money, the combination of a base plate, a series of money receptacles having slots near their base, a set of ejector slides capable of entering these slots, projections on these slides, a carriage, means for reciprocating it on the base plate in a direction parallel to the slides, a set of finger keys thereon each marked with a different sum of money, and means whereby when any of these keys are depressed and the carriage reciprocated the ejection means shall be operated, supplying the exact amount of money marked on the finger key.

14. In an apparatus for counting out and paying sums of money, the combination of a base plate, a series of money receptacles, each fitting one particular type of money, and having slots near the base, ejector slides fitting these slots, and of such size that each slide ejects only one given value of money when actuated, a reciprocating carriage carrying finger keys each having a different sum of money marked thereon, selective means carried on the carriage for connecting each key with slides capable of pushing out exactly the sum marked on the key, a bar on the carriage, a line of locking tappets thereon which when the key is pressed down lock its selecting mechanism until the money is ejected and the carriage is reciprocated backward, a bar on the carriage adapted to come into contact with the tappets and release them when the payment has been made and the carriage is reciprocated back, whereby all the tappets and the connecting mechanism between the keys and the slides is set back again into normal position.

15. In a machine for counting out and paying sums of money, the combination of a base plate, fixed receptacles for coin thereon, movable ejector slides on the base plate, a carriage traveling on said base plate, means for reciprocating said carriage, and means on the carriage for re-setting the selective mechanism in the return journey into the position which is nonactuating until brought into position by the keys and the selecting mechanism.

In witness whereof, I have hereunto signed my name this 12 day of March, 1918, in the presence of two subscribing witnesses.

HAROLD A. MORRIS.

Witnesses:
 WM. P. THOMPSON,
 CHAS. LESLIE.